(12) United States Patent
Lesieur et al.

(10) Patent No.: US 6,454,935 B1
(45) Date of Patent: Sep. 24, 2002

(54) METHOD FOR DESULFURIZING GASOLINE OR DIESEL FUEL FOR USE IN A FUEL CELL POWER PLANT

(75) Inventors: Roger R. Lesieur, Enfield, CT (US); Christopher Teeling, Enfield, CT (US); Joseph J. Sangiovanni, West Suffield, CT (US); Laurence R. Boedeker, Simsbury, CT (US); Zissis A. Dardas, Worcester, MA (US); He Huang, Glastonbury, CT (US); Jian Sun, Simsbury, CT (US); Xia Tang, West Hartford, CT (US); Louis J. Spadaccini, Manchester, CT (US)

(73) Assignee: UTC Fuel Cells, LLC, S. Windsor, CT (US)

( * ) Notice: Subject to any disclaimer, the term of this patent is extended or adjusted under 35 U.S.C. 154(b) by 0 days.

(21) Appl. No.: 09/470,483

(22) Filed: Dec. 22, 1999

(51) Int. Cl.[7] ............................................ C10G 29/06
(52) U.S. Cl. ............... 208/244; 208/208 R; 208/299; 123/1 A
(58) Field of Search .................... 208/208 R, 244, 208/299; 123/1 A

(56) References Cited

U.S. PATENT DOCUMENTS

| 3,485,746 | A | * | 12/1969 | Setzer et al. ................ 208/244 |
| 4,336,130 | A | * | 6/1982 | Miller et al. ................ 208/243 |
| 4,347,811 | A | * | 9/1982 | Lee ............................ 123/1 A |
| 4,419,968 | A | * | 12/1983 | Lee ............................... 123/3 |
| 4,976,747 | A | * | 12/1990 | Szydlowski et al. ....... 48/127.9 |
| 6,103,103 | A | * | 8/2000 | Alexander et al. .......... 208/134 |
| 6,129,835 | A | * | 10/2000 | Lesieur et al. .......... 208/208 R |

* cited by examiner

Primary Examiner—Nadine Preisch
(74) Attorney, Agent, or Firm—William W. Jones

(57) ABSTRACT

A fuel processing method is operable to remove substantially all of the sulfur present in an undiluted oxygenated hydrocarbon fuel stock supply which contains an oxygenate and which is used to power a fuel cell power plant in a mobile environment, such as an automobile, bus, truck, boat, or the like, or in a stationary environment. The power plant hydrogen fuel source can be gasoline, diesel fuel, or other like fuels which contain relatively high levels of organic sulfur compounds such as mercaptans, sulfides, disulfides, and the like. The undiluted hydrocarbon fuel supply is passed through a desulfurizer bed wherein essentially all of the sulfur in the organic sulfur compounds reacts with the nickel reactant, and is converted to nickel sulfide, while the now desulfurized hydrocarbon fuel supply continues through the remainder of the fuel processing system.

3 Claims, 4 Drawing Sheets

METHOD FOR DESULFURIZING GASOLINE OR DIESEL FUEL FOR USE IN A FUEL CELL POWER PLANT

TECHNICAL FIELD

The present invention relates to a method for desulfurizing gasoline, diesel fuel or like hydrocarbon fuel streams so as to render the fuel more suitable for use in a mobile vehicular fuel cell power plant assembly. More particularly, the desulfurizing method of this invention is operable to remove organic sulfur compounds found in gasoline to levels which will not poison the catalysts in the fuel processing section of the fuel cell power plant assembly. The method of this invention involves the use of a nickel reactant bed which has an extended useful life cycle due to the inclusion of oxygenates in the fuel stream in appropriate amounts.

BACKGROUND OF THE INVENTION

Gasoline, diesel fuel, and like hydrocarbon fuels have not been useful as a process fuel source suitable for conversion to a hydrogen rich stream for small mobile fuel cell power plants due to the existence of relatively high levels of naturally-occurring complex organic sulfur compounds. Hydrogen generation in the presence of sulfur results in a poisoning effect on all of the catalysts used in the hydrogen generation system in a fuel cell power plant. Conventional fuel processing systems used with stationary fuel cell power plants include a thermal steam reformer, such as that described in U.S. Pat. No. 5,516,344. In such a fuel processing system, sulfur is removed by conventional hydrodesulfurization techniques which typically rely on a certain level of recycle as a source of hydrogen for the process. The recycle hydrogen combines with the organic sulfur compounds to form hydrogen sulfide within a catalytic bed. The hydrogen sulfide is then removed using a zinc oxide bed to form zinc sulfide. The general hydrodesulfurization process is disclosed in detail in U.S. Pat. No. 5,292,428. While this system is effective for use in large stationary applications, it does not readily lend itself to mobile transportation applications because of system size, cost and complexity. Additionally, the gas being treated must use process recycle in order to provide hydrogen in the gas stream, as noted above.

Other fuel processing systems, such as a conventional autothermal reformer, which use a higher operating temperature than conventional thermal steam reformers, can produce a hydrogen-rich gas in the presence of the foresaid complex organic sulfur compounds without prior desulfurization. When using an autothermal reformer to process raw fuels which contain complex organic sulfur compounds, the result is a loss of autothermal reformer catalyst effectiveness and the requirement of reformer temperatures that are 200° F.–500° F. higher than are required with a fuel having less than 0.05 ppm sulfur. Additionally, a decrease in useful catalyst life of the remainder of the fuel processing system occurs with the higher sulfur content fuels. The organic sulfur compounds are converted to hydrogen sulfide as part of the reforming process. The hydrogen sulfide can then be removed using a solid absorbent scrubber, such as an iron or zinc oxide bed to form iron or zinc sulfide. The aforesaid solid scrubber systems are limited, due to thermodynamic considerations, as to their ability to lower sulfur concentrations to non-catalyst degrading levels in the fuel processing components which are located downstream of the reformer, such as in the shift converter, or the like.

Alternatively, the hydrogen sulfide can be removed from the gas stream by passing the gas stream through a liquid scrubber, such as sodium hydroxide, potassium hydroxide, or amines. Liquid scrubbers are large and heavy, and are therefore useful principally only in stationary fuel cell power plants. From the aforesaid, it is apparent that current methods for dealing with the presence of complex organic sulfur compounds in a raw fuel stream for use in a fuel cell power plant require increasing fuel processing system complexity, volume and weight, and are therefore not suitable for use in mobile transportation systems.

An article published in connection with the 21st *Annual Power Sources Conference* proceedings of May 16–18, 1967, pages 21–26, entitled "Sulfur Removal for Hydrocarbon-Air Systems", and authored by H. J. Setzer et al, relates to the use of fuel cell power plants for a wide variety of military applications. The article describes the use of high nickel content hydrogenation nickel reactant to remove sulfur from a military fuel called JP-4, which is a jet engine fuel, and is similar to kerosene, so as to render the fuel useful as a hydrogen source for a fuel cell power plant. The systems described in the article operate at relatively high temperatures in the range of 600° F. to 700° F. The article also indicates that the system tested was unable to desulfurize the raw fuel alone, without the addition of water or hydrogen, due to reactor carbon plugging The carbon plugging occurred because the tendency for carbon formation greatly increases in the temperature range between about 550° F. and about 750° F. A system operating in the 600° F. to 700° F. range would be very susceptible to carbon plugging, as was found to be the case in the system described in the article. The addition of either hydrogen or steam reduces the carbon formation tendency by supporting the formation of gaseous carbon compounds thereby limiting carbon deposits which cause the plugging problem.

It would be highly desirable from an environmental standpoint to be able to power electrically driven vehicles, such as an automobile, for example, by means of fuel cell-generated electricity; and to be able to use a fuel such as gasoline, diesel fuel, naphtha, lighter hydrocarbon fuels such as butane, propane, natural gas, or like fuel stocks, as the fuel consumed by the vehicular fuel cell power plant in the production of electricity. In order to provide such a vehicular power source, the amount of sulfur in the processed fuel gas would have to be reduced to and maintained at less than about 0.05 parts per million.

The desulfurized processed fuel stream can be used to power a fuel cell power plant in a mobile environment or as a fuel for an internal combustion engine. The fuel being processed can be gasoline or diesel fuel, or some other fuel which contains relatively high levels of organic sulfur compounds such as thiophenes, mercaptans, sulfides, disulfides, and the like. The fuel stream is passed through a nickel desulfurizer bed wherein essentially all of the sulfur in the organic sulfur compounds reacts with the nickel reactant and is converted to nickel sulfide leaving a desulfurized hydrocarbon fuel stream which continues through the remainder of the fuel processing system. Previously filed U.S. patent applications Ser. Nos. 09/104,254, filed Jun. 24, 1998; and Ser. No. 09/221,429, filed Dec. 28, 1998 describe systems for use in desulfurizing a gasoline or diesel fuel stream for use in a mobile fuel cell vehicular power plant; and in an internal combustion engine, respectively.

We have discovered that desulfurization of a gasoline or diesel fuel stream which uses a nickel catalytic adsorbant bed cannot be performed over a significantly extended period of time unless the fuel stream includes an oxygenate compound in appropriate proportions. Various oxygenates could suffice for the desulfurization process including MTBE, ethanol or other alcohols, ethers, or the like.

DISCLOSURE OF THE INVENTION

This invention relates to an improved method for processing a gasoline, diesel, or other hydrocarbon fuel stream over an extended period of time, which method is operable to remove substantially all of the sulfur present in the fuel stream. Examples of gaseous hydrocarbon fuels which can be desulfurized in accordance with this invention include methane, ethane, propane and butane.

Gasoline, for example, is a hydrocarbon mixture of paraffins, napthenes, olefins and aromatics, whose olefinic content is between 1% and 15%, and aromatics between 20% and 40%, with total sulfur in the range of about 20 ppm to about 1,000 ppm. The national average for the United States is 350 ppm sulfur. The legally mandated average for the State of California is 30 ppm sulfur. As used in this application, the phrase "California Certified Gasoline" refers to a gasoline which has between 30 and 40 ppm sulfur content, and which contains about 11% by volume MTBE at the present time. California Certified Gasoline is used by new car manufacturers to establish compliance with California emissions certification requirements.

We have discovered that the presence of oxygenates in the gasoline, like MTBE (methyl-tertiary-butyl ether, i.e., $(CH_3)_3COCH_3$), or ethanol, for example, prevent rapid deactivation of the nickel catalytic adsorption of organic sulfur compounds from the fuel stream. Ethanol could be an appropriate solution to this problem since it is non-toxic, is not a carcinogen, and is relatively inexpensive and readily available in large supplies as a byproduct of the agriculture industry. Methanol, which would also extend the desulfurizer bed life, is not preferred since it is toxic; while MTBE is likewise not preferred since it is thought to be a carcinogenic compound, and may be banned in certain areas of the United States in the near future by new environmental regulations. Preferred oxygenates are non-toxic and non-carcinogenic oxygen donor compounds, such as ethanol or the like. When water is an oxygenate included ion the gasoline or diesel fuel mixture being desulfurized, the water content of the fuel mixture should be in the range of about 2% to about 5% by weight of the fuel mixture.

The effectiveness of a nickel adsorbent reactant to adsorb organic sulfur compounds from gasoline depends on the relative coverage of the active reactant sites by adsorption of all the various constituents of gasoline. In other words, the catalytic desulfurization process depends on the amount of competitive adsorption of the various constituents of gasoline. From the adsorption theory, it is known that the relative amount of adsorbate on an adsorbent surface depends primarily on the adsorption strength produced by attractive forces between the adsorbate and adsorbent molecules; secondarily on the concentration of the adsorbate in the gasoline, and temperature. Coverage of a reactant surface by an adsorbate increases with increasing attractive forces; higher fuel concentration; and lower temperatures. Relative to gasoline, Somoriai (*Introduction to Surface Chemistry and Catalysis*. pp, 60–74) provides some relevant information on the adsorption of hydrocarbons on transition metal surfaces, such as nickel. Saturated hydrocarbons only physically adsorb onto the nickel reactant surface at temperatures which are less than 100° F., therefore paraffins, and most likely napthenes, won't compete with sulfur compounds for adsorption sites on the nickel reactant at temperatures above 250° F. and 300° F.

On the other hand, unsaturated hydrocarbons, such as aromatics and olefins, adsorb largely irreversibly on transition metal surfaces even at room temperature. When an unsaturated hydrocarbon such as an aromatic or an olefin adsorbs on a transition metal surface, and the surface is heated, the adsorbed molecule rather than desorbing intact, decomposes to evolve hydrogen, leaving the surface covered by the partially dehydrogenated fragment, i.,e., tar or coke precursors. We have discovered that, at 350° F., unsaturated hydrocarbons are nearly completely dehydrogenated, and the dehydrogenated tar fragments form multiple carbon atom-to-nickel reactant surface bonds. This explains why aromatics and olefins in gasoline, in the absence of oxygenated compounds in appropriate concentrations, will deactivate the nickel nickel reactant from adsorbing sulfur after a relatively short period of time.

In general, the adsorption strength of a compound depends on the dipole moment, or polarity, of the molecule. A higher dipole moment indicates that the compound is more polar and is more likely to adsorb on a reactant surface. Aromatics are an exception to this rule because their molecular structure includes a $\pi$ ring of electron forces that produces a cloud of induced attractive forces with adjacent surfaces. Based on the dipole moments of hydrocarbons, allowing for the $\pi$ ring in aromatics, the order of adsorption strength (highest to lowest) is: nitrogenated hydrocarbons>oxygenated hydrocarbons>aromatics>olefins>hydrocarbons containing sulfur>saturated hydrocarbons. Since the adsorption strength of the oxygenated hydrocarbons (such as ethanol, methanol, MTBE, or the like) is greater than that for aromatics and olefins, oxygenated hydrocarbons, or other oxygen donor compounds, if present in the gasoline or diesel fuel stream being desulfurized, will provide greater coverage of the nickel reactant sites than do the aromatics and olefins in the gasoline. Thus, the oxygenated hydrocarbons can reduce the adsorption of aromatics and olefins on the nickel reactant bed. Although saturated hydrocarbons (paraffins and cycloparaffins) would not be expected to be adsorbed on the desulfurization nickel reactant to a significant extent, oxygenated hydrocarbons will also prevent them from adsorbing onto the nickel reactant.

We have also discovered that the adsorbed oxygenated hydrocarbons do not inhibit the sulfur compounds from being adsorbed on the nickel reactant. The oxygenated hydrocarbons and the sulfur compounds are both quite polar and therefore they are miscible, which allows the sulfur compounds to dissolve into and diffuse through the adsorbed layer of oxygenated hydrocarbon to the active nickel metal reactant sites. Thus, the oxygenated hydrocarbons provide a "shield" which inhibits the carbon-forming hydrocarbons from contacting the nickel reactant sites while allowing the sulfur compounds to contact and react with the active nickel metal reactant sites.

Further non-essential but enabling information relating to this invention will become readily apparent to one skilled in the art from the following detailed description of a preferred embodiment of the invention when taken in conjunction with the accompanying drawings in which:

SPECIFIC MODES FOR CARRYING OUT THE INVENTION

Figure 1:
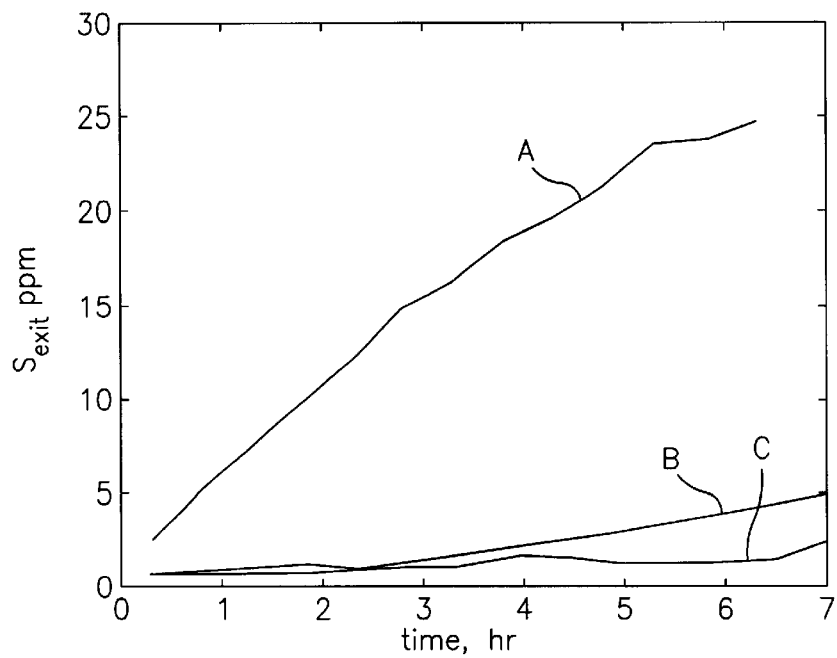
FIG. 1 is a graph of the result of a short (seven hour) desulfurizer bed test run with three different modified formulations of California Certified Gasoline showing the sulfur level in parts per million (ppm) at the reactant bed exit for the various gasoline formulations, versus the test run operating time in hours.

Referring now to the drawings, FIG. 1 is a graph of the results of relatively short desulfurizer test runs using various formulations of California Certified Gasoline, which graph shows the sulfur level in ppm for the various formulations at the reactant bed exit, versus the operating time of the test runs in hours. In these short term (seven hour) test runs, sulfur was added to all of the California Certified Gasoline formulations, so that the gasoline contained 240 ppm of sulfur. One of the gasoline formulations contained 11% MTBE by volume, which is an oxygenate and which is presently a conventional component of California Certified Gasoline; another of the formulations contained 10% ethanol by volume, which is also an oxygenate; and the third formulation contained essentially no oxygenate. In each of the test runs, the gasoline was run through a nickel reactant bed so as to attempt to remove sulfur from the gasoline. The trace line A shows the sulfur content of the gasoline formulation which did not contain an oxygenate. The sulfur content was measured at the exit end of the desulfurizer reactant bed. Trace A clearly shows that the oxygenate-free gasoline formulation had a steadily rising sulfur content at the desulfurizer exit during the duration of the test despite being run through the desulfurizer reactant bed indicating deactivation of the desulfurization reactant. Trace B shows the sulfur content of the gasoline formulation which contained MTBE. Trace C shows the sulfur content of the gasoline formulation which contained ethanol. This graph shows a major improvement and a decrease in sulfur at the reactant bed exit, when an MTBE or ethanol oxygenate is contained in the gasoline. This graph shows that the oxygenate component of the gasoline prolongs the ability of the reactant bed to remove sulfur from the gasoline.

Figure 2:
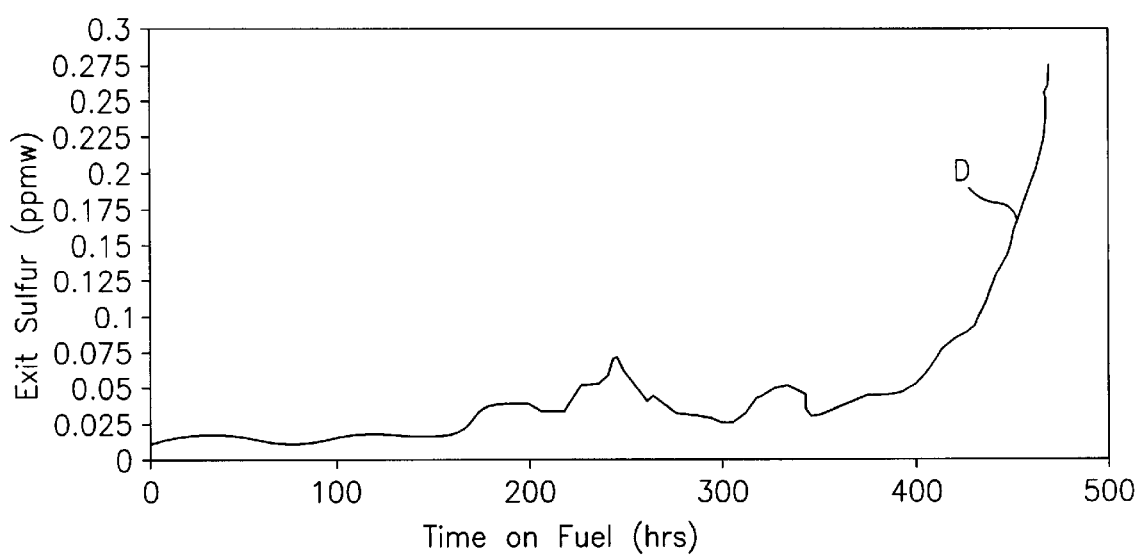
FIG. 2 is a graph of the results of a longer desulfurizer bed test run (about four hundred eighty five hours) with unmodified California Certified Gasoline showing the sulfur level in the gasoline in ppm at the nickel reactant bed exit, versus the operating time in hours.

FIG. 2 is a graph of the results of a longer desulfurizer test run using California Certified Gasoline which contained about 30 ppm sulfur and about 11% MTBE by volume. The test was run until sulfur breakthrough occurred. The goal of the desulfurizer is to maintain the sulfur content of the gasoline below about 0.05 ppm so that the gasoline will be suitable for processing for use in a mobile fuel cell power plant. Therefore, "sulfur breakthrough" is defined by our requirements as occurring when a sustained post-reactant bed sulfur content of greater than about 0.05 ppm in the gasoline is present. The trace D shows the sulfur level in ppm at the exit of the reactant bed versus the operating time in hours and shows that the desulfurizer operated successfully for about 400 hours with consistent sulfur levels in nickel reactant bed exit stream of below 0.05 ppm. In this test run, the long term benefit of using an oxygenate in the fuel to minimize sulfur penetration through the desulfurizer device is demonstrated.

Figure 3:
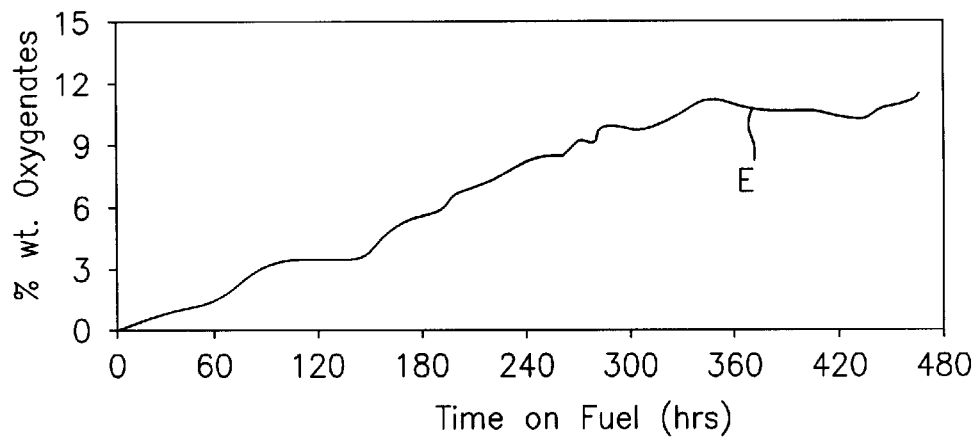
FIG. 3 is a graph of the results of the same desulfurizer bed test run shown in FIG. 2, but showing the oxygenate level in the gasoline, in percent by weight, at the reactant bed exit, versus the test run operating time in hours.

FIG. 3 is a graph of the results of the same longer term desulfurizer test run shown in FIG. 2, but showing the oxygenate level by percent weight at the nickel reactant bed exit versus the operating time in hours. From this figure, it will be noted that when the nickel reactant bed can no longer decompose the oxygenate, the nickel reactant loses its ability to remove organic sulfur compounds. It is noted from trace E in FIG. 3 that at about 400 hours, the MTBE content of the gas stream exiting the nickel reactant bed was about 11% by volume which is the same concentration of MTBE in the gasoline stream entering the nickel reactant bed. Note that early in the test run, the nickel reactant bed is more capable of decomposing the MTBE, but this ability gradually declines as the test run continues. This inability to decompose the oxygenate results in an increase in the sulfur content at the nickel reactant bed exit, as shown in FIG. 2.

Figure 4:
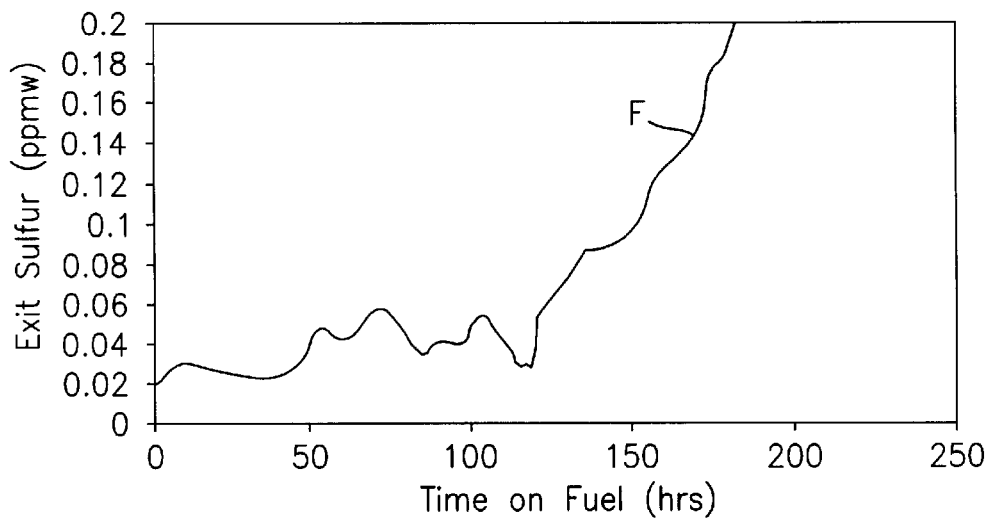
FIG. 4 is a graph of the result of a desulfurizer bed test run with a commercially available gasoline showing the sulfur level in ppm at the nickel reactant bed exit versus the operating time of the desulfurizer in hours.

FIG. 4 is a graph of the results of another longer term desulfurizer test run using a gasoline which had about a 90 ppm sulfur content and which contained about 11% MTBE by volume. Trace F shows that the sulfur level at the nickel reactant bed exit remained below 0.05 ppm for about 125–135 hours, after which sulfur breakthrough occurred. In this test run, the long term benefit of using oxygenates in the fuel to minimize sulfur getting through the desulfurizing bed is also demonstrated.

Figure 5:
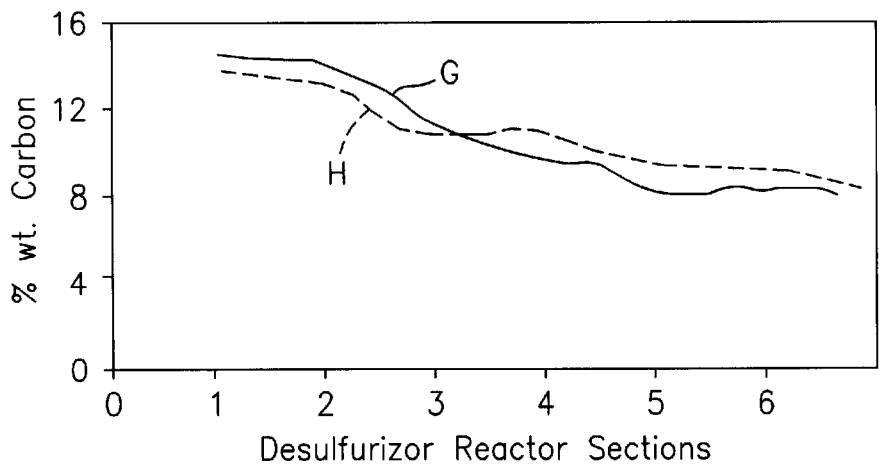
FIG. 5 is a graph of the result of several different duration desulfurizer bed test runs using different modified formulations of California Certified Gasoline, one with, and one without oxygenates, and showing the carbon level (in percent by weight) which was deposited on the reactant in each successive section of the desulfurizer at the end of the test runs.

FIG. 5 is a graph showing the results of two desulfurizer test runs using two different formulations of California Certified Gasoline, one containing an oxygenate (MTBE, 11% by volume), and the other containing no oxygenate. This graph shows the carbon level by percent weight deposited in each successive section of the desulfurizer nickel reactant bed. In this figure, the post test carbon content for successive sections of the desulfurizers was measured and is shown for two tests that were run for different time periods, both of which were run until sulfur breakthrough occurred. Trace H shows the results of the test run for the gasoline formulation that contained no oxygenate. This test was run for 60 hours at which point in time, sulfur breakthrough occurred. Trace G shows the results of the test run for the gasoline formulation that contained MTBE. This test was run for 485 hours at which point in time, sulfur breakthrough occurred. It was noted that the presence or absence of the oxygenate in the gasoline being processed did not effect the carbon build up profile on the nickel reactant bed, but it did increase the time period which is needed to reach the sulfur breakthrough point in terms of carbon deposition. In each test, the degree of carbon build up on the nickel reactant at the sulfur breakthrough point in each section of the desulfurizer is almost exactly the same. This figure demonstrates that "sulfur breakthrough" is a function of the extent of carbon deposition on the nickel reactant bed, and is not a function of the extent of sulfur removal by the nickel reactant bed. This figure also demonstrates that the addition of oxygenates to the gasoline retards carbon deposition on the nickel reactant bed, and thus enables extended sulfur removal from the fuel stream by the nickel reactant bed.

At this stage, we conclude that the presence of oxygenates in the gasoline maintains the desulfurization activity of the nickel reactant by significantly suppressing the carbon content (coke deposits and strongly adsorbed species), and by keeping the nickel reactant active sites clean and available for desulfurization of the S-containing organic molecules. As was mentioned before, this could be achieved by an in situ formation of hydrogen and/or water vapor due to the MTBE decomposition process (chemical reaction effect). Therefore, we propose that MTBE, and for the same reason any oxygenated organic molecule, is strongly adsorbed on the nickel surface due to its high dipole moment where it decomposes to isobutylene and methanol. The adsorbed oxygenate decomposes because the nickel reactant is very active and the C—O bond can easily break. In general, the order in the required energy to break a C—X bond is:

$$C-O < C-S < C-N < C-C < C-H$$

A nickel catalyst promotes the formation of methanol, a byproduct of MTBE decomposition, or ethanol disproportionation reaction. When methanol is decomposed, the following reactions occur:

$$4CH_3OH \rightarrow 3CH_4 + CO_2 + 2H_2O \quad (1)$$

$$4CH_3OH \rightarrow 2CH_4 + 2CO_2 + 4H_2 \quad (2)$$

For ethanol, the same reactions should produce ethane instead of methane. The presence of water vapor or hydrogen is well known to suppress carbon formation, especially at elevated temperatures. The hydrogen produced on the nickel reactant bed by equation (2) will hydrogenate carbon precursors emanating from the desulfurized organic sulfur components, and from the adsorbed/decomposed olefins and aromatics in the gasoline, through reaction with hydrogen emanating from the desulfurized fuel gas (Ely-Rideal mechanism) or through hydrogen spill over. Hydrogenation of carbon precursors from sulfur compounds, olefins and aromatics could occur entirely on the nickel reactant surfaces from spill over of hydrogen generated by decomposition of the MTBE without initiating hydrogen exchange with the fuel gas stream. "Spill over" is the surface migration of hydrogen atoms from the nickel reactant site(s) that produce the hydrogen in equation (2) to the site(s) that adsorb the olefins and aromatics.

The formation of hydrogen is demonstrated in Table 1 (below), which shows the decrease in olefin level during the desulfurization process for the same commercially available gasoline containing MTBE shown in FIG. 4. Apparently, the hydrogen provided by decomposition of MTBE serves to hydrogenate the olefins thereby forming saturated parafins. It is apparent from Table 1 that the decomposition of MTBE not only generates hydrogen, but also catalyzes the dehydrogenation of naphthenes to generate aromatics and more hydrogen.

Table 1 is a "PONA" (which is an acronym for paraffins, olefins, naphthene, and aromatics) analysis of the changes in PONA compounds which are found in the gasoline described in FIG. 4, both before and after desulfurization; and also of the change in the sulfur content of the gasoline.

TABLE 1

| Hydrocarbon Type | Before Desulfurization | After Desulfurization |
|---|---|---|
| Paraffins | 38.8% | 41.1% |
| Olefins | 14.9% | 12.6% |
| Naphthenes | 9.6% | 5.8% |
| Aromatics | 36.7% | 40.6% |
| Sulfur | 90 ppm | <0.05 ppm |

Table 2 shows that, without MTBE, there is essentially no change in the "PONA" percentages in a low sulfur content, commercially available gasoline which is passed through the desulfurization nickel reactant bed. Also, Table 2 demonstrates that the sulfur content of the low sulfur content gasoline still contains an unacceptably high content of sulfur after the desulfurization step.

TABLE 2

| Hydrocarbon Type | Before Desulfurization | After Desulfurization |
|---|---|---|
| Paraffins | 64.6% | 64.5% |
| Olefins | 3.7% | 3.65% |
| Naphthenes | 2.89% | 2.82% |
| Aromatics | 28.8% | 29% |
| Sulfur | 30.9 ppm | 1.0 ppm |

Figure 6:
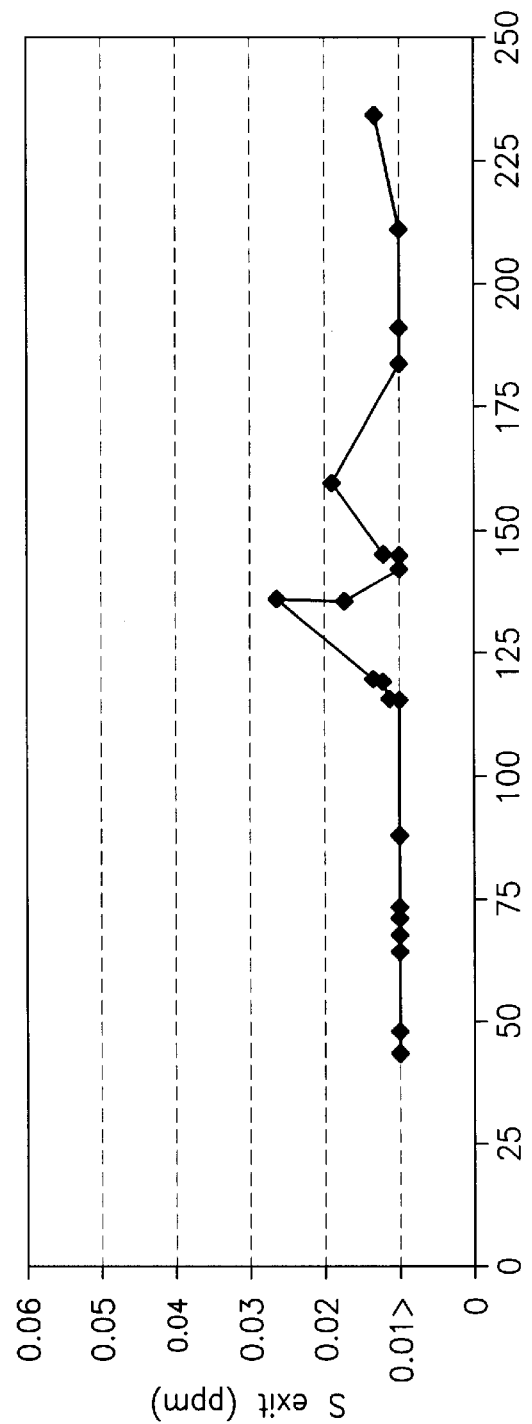
FIG. 6 is a graph of the sulfur content of the exit stream of a desulfurized gasoline fuel stream over a period of time at varied operating temperatures, when a small amount of water is present, and when no water is present, in the fuel stream.
Figure 7:
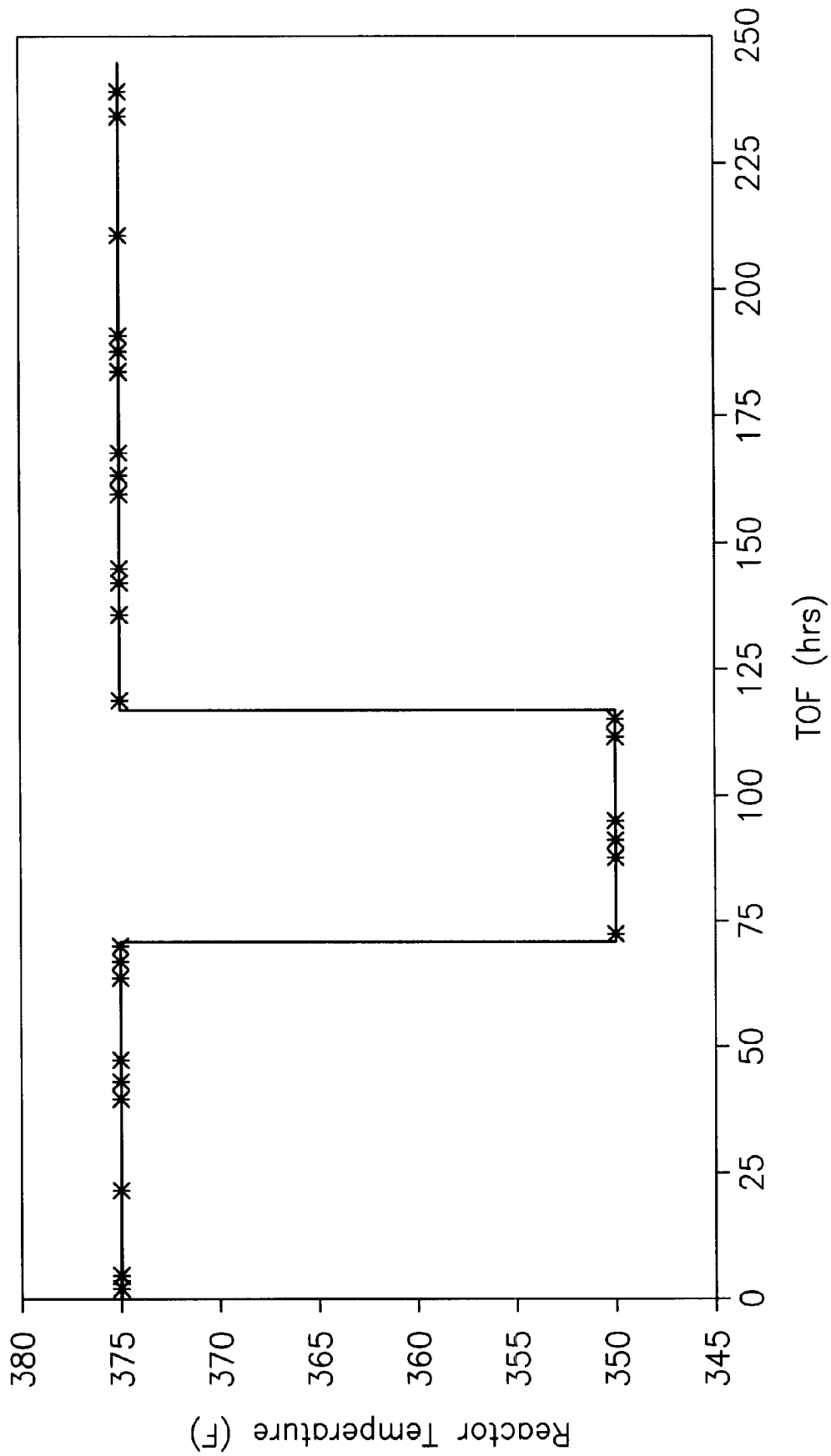
FIG. 7 is a graph of the operating temperatures of the system described in FIG. 6 over the same period of time.

Desulfurization of a gasoline fuel sample containing about 30 ppm sulfur was carried out at a temperature of 375° F. FIG. 6 shows the exit stream desulfurization history of this low sulfur gasoline fuel sample. The desulfurization test run shown in FIG. 6 was run at a temperature of 375° F., except for the time period between 73 and 120 hours. During that time period, the reaction temperature was lowered to 350° F., as shown in FIG. 7. At the 375° F. operating temperature, the fuel stream exiting the desulfurizer nickel reactant bed contained about 1% to about 2% water condensate which was derived from the MTBE. At the operating temperature of 350° F., the exiting fuel stream did not contain any obvious water condensate. This fact confirms the formation of water, and coextant superior desulfurization results obtained when water is present in the fuel stream. It is noted from FIG. 6, that after the operating temperature is lowered to 350° F., and the water condensate in the fuel stream disappears, the sulfur level in the exiting fuel stream begins to rise, and then, sometime after the operating temperature is increased, and the water condensate reappears in the fuel stream, the sulfur level in the exiting fuel stream subsides.

Figure 8:
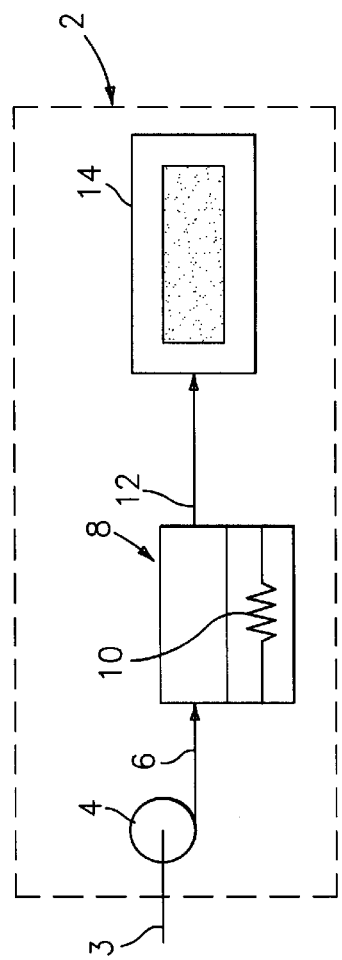
FIG. 8 is a schematic view of an embodiment of the gasoline desulfurizer system of this invention, which desulfurizes gasoline on board a vehicle powered by a fuel cell power plant.

FIG. 8 shows an embodiment of the desulfurization system of this invention wherein the desulfurizing bed 8 is positioned onboard a vehicle 2. The system includes a fuel line 3 from the vehicle gas tank to a pump 4 which pumps the fuel through a line 6 to the desuffurizer bed 8. The bed 8 is heated to operating temperatures by an electric heater 10. The desulfurized gasoline passes from the desulfurizing bed 8 through a line 12 to the fuel cell power plant 14 where the desulfurized fuel is further processed and converted to electricity for powering the vehicle 2.

We have determined that the oxygenate not only protects the nickel reactant metal surface with an oxygenate "shield", it also produces hydrogen and water which enables the metal surface to remain free of excessive carbon deposits for longer periods of time than if no oxygenate were present. The addition of very small quantities of water in the fuel stream at the desulfurizer bed inlet, or the recirculation of a 1% to 10%, by volume, fraction of the fuel stream emanating from a downstream selective oxidizer outlet back to the desulfurizer bed inlet, would provide the same quantity of water and hydrogen as can be produced from the MTBE.

As a result, the MTBE could be eliminated from the gas stream when a fuel cell recycle stream is utilized. Minimal amounts of water can be injected, either by itself, or when recycle is employed, contrary to the teachings of aforementioned Setzer et al article which was published in the 21*st Annual Power Sources* conference proceedings, which article requires the use of three pounds of water for one pound of fuel in order to reform the fuel gas stream.

By contrast, utilization of selective oxidizer exhaust will provide only 2%–5% water for introduction into the desulfurizer bed, which would provide sufficient hydrogen to hydrogenate the adsorbed olefins and prevent the fouling of the metal nickel reactant surface with carbonaceous deposits. The operating range of 300° F–450° F. for liquid fuels, and 250° F.–450° F. for gaseous fuels, both of which are below the temperature range suggested in the prior art for the performance of a hydrodesulfurization process are available in performance of this invention.

It will be readily appreciated that the addition of an effective amount of an oxygenate, or water, or a fuel cell fuel processing recycle stream which contains water and hydrogen, to a sulfur-containing fuel, will allow the sulfur to be removed from the fuel to the extent necessary for use of the fuel as a hydrogen source for a mobile fuel cell power plant without poisoning the fuel cell power plant nickel reactant beds with sulfur. The sulfur compounds are removed from the fuel by means of a nickel reactant bed through which the fuel-flows prior to entering the fuel cell power plant's fuel processing section. The oxygenate, hydrogen-containing recycle, or water (steam) addition, also serves to control carbon deposition on the nickel reactant bed thereby extending its useful life and enhancing the sulfur removal capabilities of the nickel reactant bed.

Since many changes and variations of the disclosed embodiment of the invention may be made without departing from the inventive concept, it is not intended to limit the invention otherwise than as required by the appended claims.

What is claimed is:

1. A method for desulfurizing a liquid gasoline fuel stream so as to convert the gasoline fuel stream into a low sulfur content fuel, which low sulfur content fuel is suitable for use in a fuel processing section in a fuel cell power plant, said method comprising the steps of:
   a) providing a nickel reactant desulfurization station which is operative to convert sulfur contained in organic sulfur compounds contained in the fuel stream to nickel sulfide;
   b) maintaining said nickel reactant desulfurization station at a temperature in the range of about 300° F. to about 450° F.;
   c) introducing a mixture of about 2% to about 5% by weight water and a liquid gasoline fuel stream into said nickel reactant desulfurization station, said water being present in said mixture in an amount which is effective to provide a low sulfur content gasoline fuel stream at an exit end of said nickel reactant station, which low sulfur content gasoline fuel stream contains no more than about 0.05 ppm by weight sulfur; and
   d) said water being at least partly consumed by said nickel reactant during said desulfurizing step, said low sulfur content gasoline fuel stream being formed so long as said nickel reactant continues to consume the water.

2. The method of claim 1 wherein the water in said mixture is derived by recirculating a portion of a selective oxidizer output back to an inlet to said nickel reactant station.

3. The method of claim 2 wherein said recirculated portion of the selective oxidizer output is between 1% and 10% of the total selective oxidizer output.

* * * * *